June 4, 1963
M. J. PURETIC
3,091,880
MEANS FOR RECOVERING FISH FROM A NET AND
TRANSFERRING SAME ONTO A BOAT
Filed Nov. 20, 1961
3 Sheets-Sheet 2
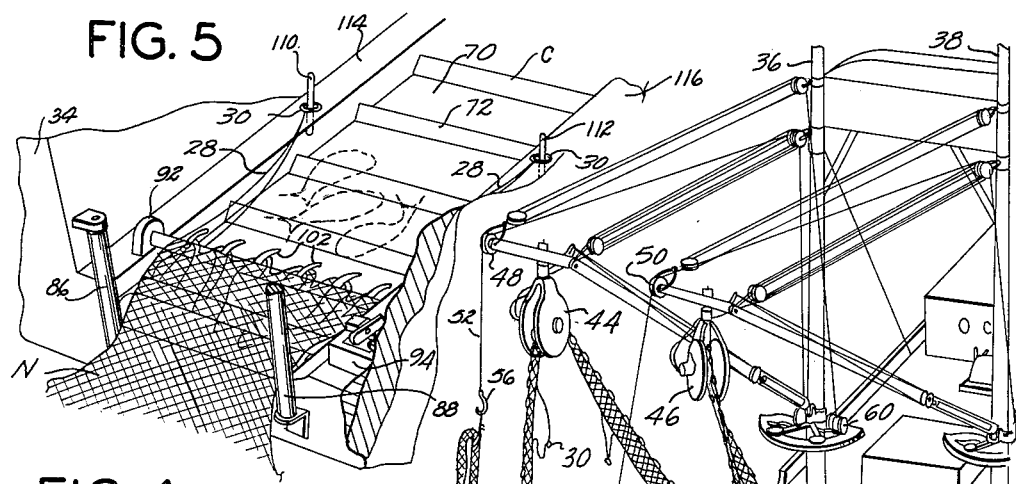
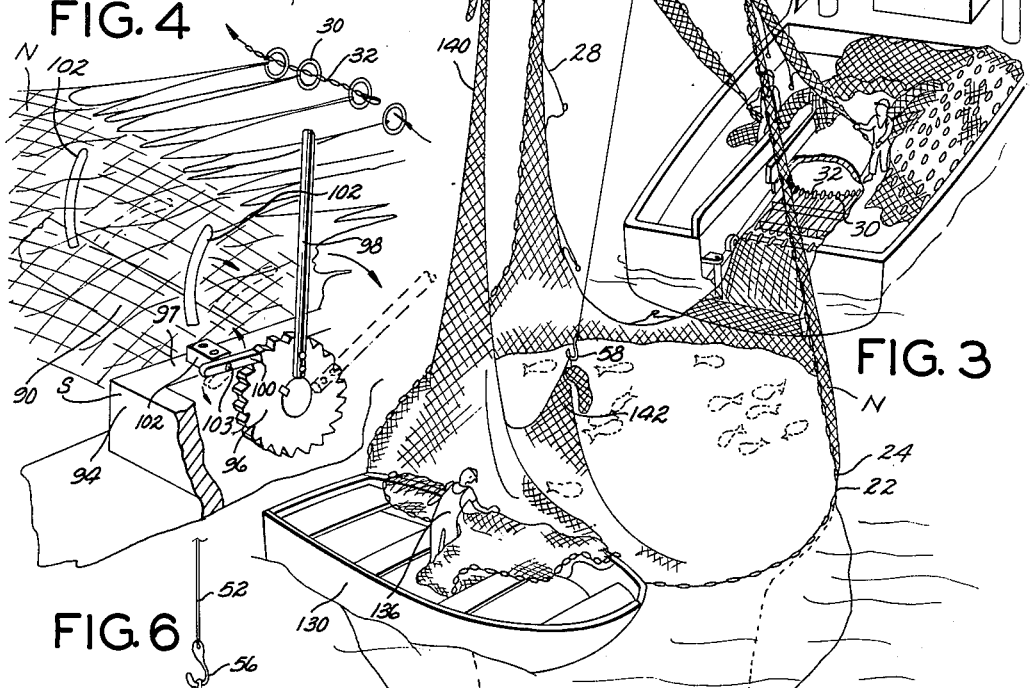
INVENTOR.
MARIO J. PURETIC
BY FULWIDER, MATTINGLY
& HUNTLEY
ATTORNEYS

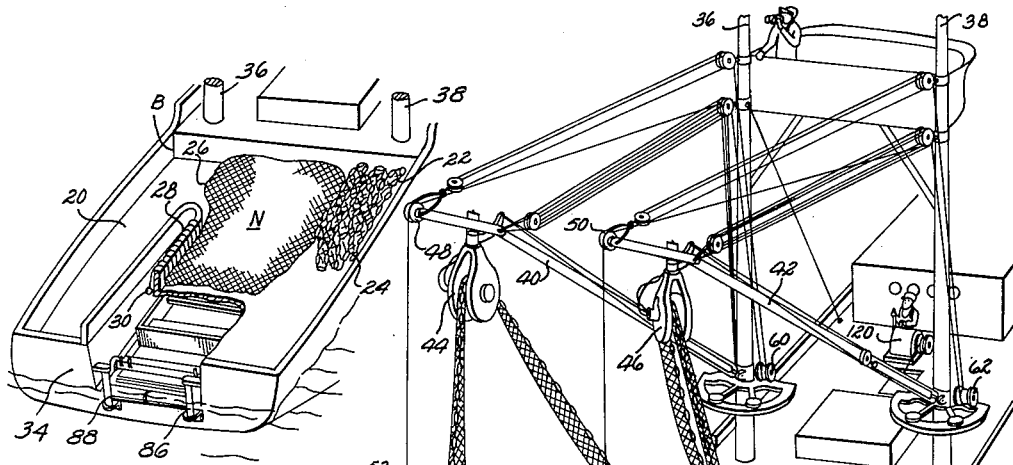

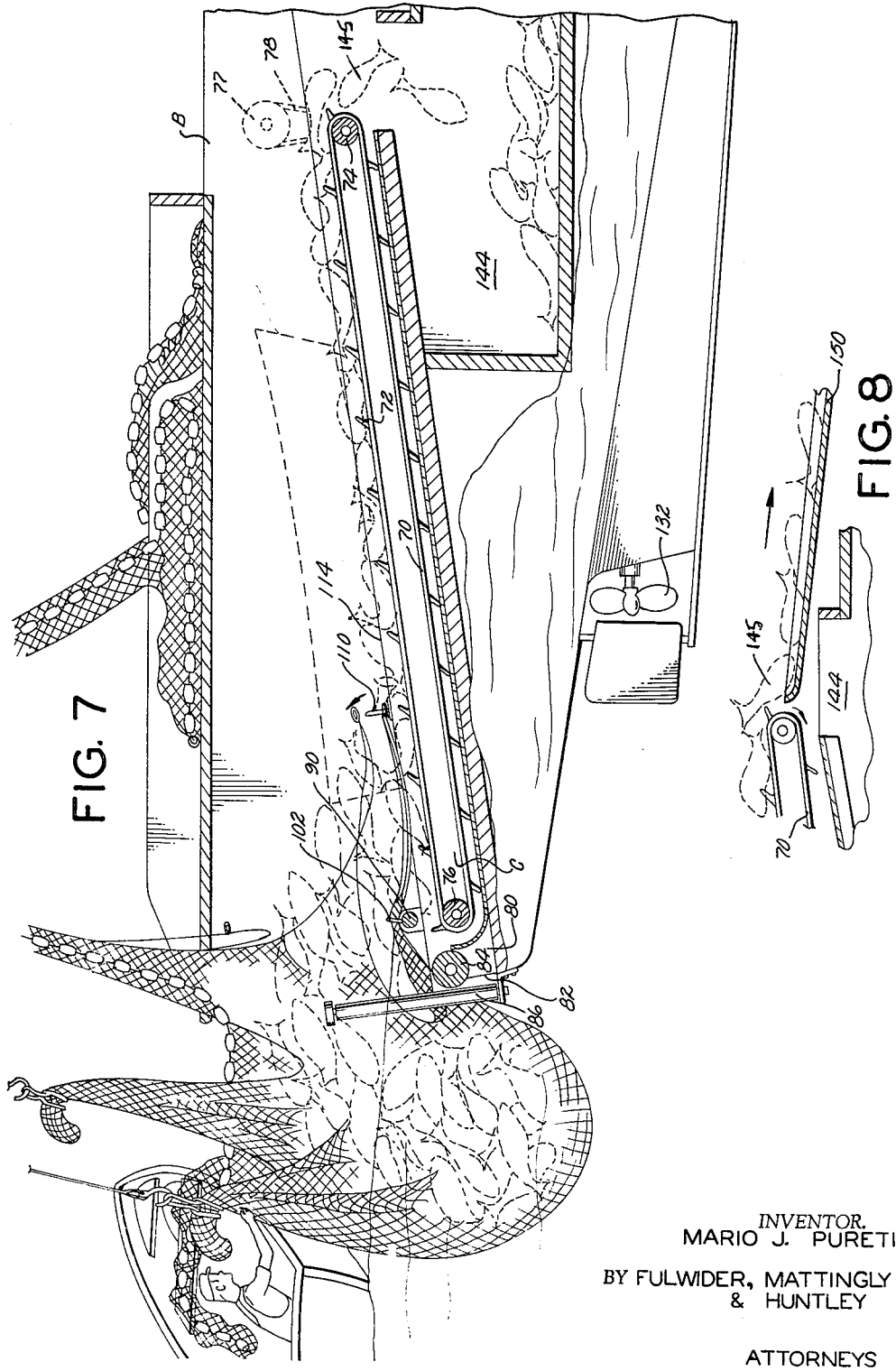

United States Patent Office 3,091,880
Patented June 4, 1963

3,091,880
MEANS FOR RECOVERING FISH FROM A NET AND TRANSFERRING SAME ONTO A BOAT
Mario J. Puretic, 30514 Avenida Corona, San Pedro, Calif.
Filed Nov. 20, 1961, Ser. No. 153,539
12 Claims. (Cl. 43—8)

The present invention relates generally to the art of fishing and more particularly to a novel system for recovering fish from a net and transferring such fish onto a fishing boat.

Although fishing is one of the oldest arts, comparatively little has been done over the years to change apparatus and methods that have been utilized in the fishing art for centuries. A fundamental and novel advance in the art of fishing is disclosed in my United States Letters Patent Nos. 2,733,530 and 2,733,531, issued February 7, 1956. These patents relate to an apparatus and method for drawing a net alongside a fishing boat by means of a power-driven block suspended from a boom on the boat. The use of such power-driven block has greatly expedited the hauling-in of the net alongside the boat, and it has been possible in many cases to substantially reduce the number of men required for a commercial fishing boat crew. Although the use of such power-driven blocks permits the netted fish to be brought alongside the fishing boat in a minimum period of time, there still remains the difficult problem of recovering the fish from the net and transferring the fish into the hold of the fishing boat.

It is conventional to scoop the netted fish from the net by means of a shallow, basket-like device, generally termed a brailer. This brailer generally comprises a rigid hoop approximately five or six feet in diameter from which depends an open-topped bag-like net. The hoop is attached to a long handle. This handle is manipulated by two or three men positioned in a large skiff alongside the fishing boat. These men manually urge the hoop into the mass of heavy fish within the seine. Thereafter, the hoop is hoisted towards the fishing boat by means of a line attached hereto and extending to the fishing boat's deck. During this operation the skiff is usually pitching heavily in the sea. Thus, the brailing operation is a dangerous job requiring great experience and tremendous strength. Moreover, this operation is time consuming. Alternatively, the netted fish may be pumped into the fishing boat. This system, however, is only useable with smaller fish.

It is a major object of the present invention to provide a novel system utilizing conveyor belt means for rapidly and safely transferring netted fish onto a fishing boat.

In general, the novel system of the present invention includes conveyor belt means mounted on the stern of a fishing boat with one end of the conveyor belt means submerged. The fishing boat is also provided with net handling means whereby the net may be closed and then drawn alongside the stern of the boat whereafter the net is gradually hoisted so as to empty the fish entrapped within the net onto the conveyor belt means. The conveyor belt means then transfers such fish into the fish-receiving hold or holds of the fishing boat.

More particularly, the preferred net handling means utilized with the present invention includes a pair of power-driven blocks of the type disclosed and claimed in my United States Patent No. 2,733,531 entitled Net Handling Apparatus, issued February 7, 1956. These power blocks are mounted in a raised position adjacent the stern of the fishing boat. Preferably, the net will be of the purse seine type. When the net has been pursed the power blocks are employed to draw or winch-in the net alongside the stern of the fishing boat. Thereafter, additional hoisting means are employed to gather the net into a pocket-like configuration, with such hoisting means progressively tilting such pocket so as to gradually empty the fish therein into the lower portion of the conveyor belt.

It is a major object of the present invention to provide a system for transferring netted fish onto a fishing boat which is faster and more efficient than conventional fish brailing operations. In this regard, the use of a pair of power blocks permits both ends of the net to be drawn onto the fishing boat concurrently. Additionally, the conveyor belt means permits the fastest possible transfer of fish from the net onto the fishing boat.

It is a further object of the present invention to provide a system of the aforedescribed nature which permits the fishing operations to be conducted with a minimum of personnel. Moreover, the physical labor required of such personnel is far less than with conventional fishing means.

It is a feature of the present invention that the net may be readily kept clear of the fishing boat. This is true since the screw of such boat may be operated so as to keep the boat moving forwardly relative to the water whereby the net will be constantly maintained rearwardly of the stern of the fishing boat.

It is yet another object of the present invention to provide a system of the aforedescribed nature which permits the use of a skiff that is smaller than the conventionally used skiffs. Moreover, the skiff may be stored in a tunnel formed in the fishing boat's stern, such tunnel housing the conveyor belt means. With this arrangement, the skiff may be readily launched or pulled aboard in any weather. Conventionally, the skiff is carried on the deck of the fishing boat and is raised or lowered therefrom by a boom.

These and other objects and advantages of the present invention will become apparent when taken in conjunction with the appended drawings wherein:

FIGURE 1 is a perspective view showing the rear portion of a fishing boat whereon is installed a preferred form of apparatus embodying the present invention, with the fishing net being arranged on deck;

FIGURE 2 is a perspective view showing the apparatus of the present invention being utilized to draw a loaded fishing net towards the stern of the fishing boat;

FIGURE 3 is a perspective view similar to FIGURE 2 showing said net being progressively drawn onto the fishing boat;

FIGURE 4 is an enlarged fragmentary perspective view showing a temporary net support unit for said net;

FIGURE 5 is a fragmentary perspective view showing a step in the retrieval of said fish net by said apparatus;

FIGURE 6 is a perspective view showing a step in the progressive hoisting of said fish net towards said fishing boat;

FIGURE 7 is a side view partially broken away in vertical section showing the rear portion of said fishing boat as fish are being dumped out of said net in a conveyor belt unit of said apparatus; and FIGURE 8 is a fragmentary vertical sectional view showing a fish-transfer chute which may be utilized with said apparatus.

Referring to the drawings, it should be understood that apparatus constructed in accordance with the teachings of the present invention are adapted for use in retrieving nets and the lines connected therewith from the sea, with sections of said nets and lines being thereafter sequentially disposed aboard a fishing boat in stacked arrangement.

In FIGURES 1 and 2 there is shown a fishing boat B having a stern deck 20 whereon is disposed a net N. The net N is commonly termed a seine net. A seine net of this type includes a float or cork line 22 which as its name implies has a number of corks, floats or other buoyant bodies 24 attached thereto at spaced intervals.

An elongated wall or panel of webbing 26 is supported from the cork line 22. The lower edge portions of the webbing panel 26 are affixed to a plurality of ring cables 28. Each of the ring cables 28 is secured to a pursing ring 30. The pursing rings 30 removably receive a weighty purse line 32. The purse line 32 is adapted to have its length reduced so as to "purse" the lower portion of the webbing panel together in a conventional manner.

In FIGURE 1 the net N and its associated parts are shown disposed upon the stern deck 20 of the fishing boat B. When a school of fish is sighted the net N will be set in a conventional manner to encircle such school. At this time both vertical edges of the net N will be secured to the boat B. When the net N is set it will be apparent that the lower edge thereof will be maintained submerged by the weight of the rings 30 and the purse line 32. In FIGURE 2 the purse line 32 has been drawn onto the boat so as to first close or purse the lower portion of the net and thereafter draw the purse rings 30 adjacent the transom 34 of the boat B.

With further reference to FIGURE 2, the boat B is provided with a pair of masts 36 and 38. At their lower portions these masts pivotally support a pair of booms designated 40 and 42, respectively. Conventional cable rigging is provided to permit the free ends of the booms 40 and 42 to be raised and lowered relative to the boat B. The free ends of the booms 40 and 42 support a pair of power blocks 44 and 46, respectively. These power blocks 44 and 46 are of the type disclosed in my United States Letters Patent No. 2,733,531, issued February 7, 1956. This type of power block has become conventional equipment on many fishing boats and is used to rapidly retrieve a seine net and deposit it upon the deck of a fishing boat. The details of the lower blocks 44 and 46 are not within the scope of the present invention and hence such details are not set forth herein. The free ends of the booms 40 and 42 are each provided with a sheave designated 48 and 50, respectively. These sheaves 48 and 50 receive hoisting lines 52 and 54, respectively. The hoisting lines 52 and 54 are attached to a pair of hooks designated 56 and 58, respectively, utilized for a purpose to be set forth hereinafter. Conventional power-driven winch means 60 and 62 are provided adjacent the base of the masts 36 and 38 to effect operation of the hoisting lines 52 and 54.

Referring now additionally to FIGURE 7, it is a particular feature of the present invention that the stern portion of the boat B is provided with a conveyor belt unit, generally designated C. The conveyor belt unit C includes an endless belt member 70, preferably provided with transverse ribs 72 at longitudinally spaced portions of its outer side. The belt 70 is supported between a horizontal upper roller 74 and a horizontal lower roller 76. The upper roller 74 is driven as by a conventional hydraulic or electric motor 77 through a belt 78. It will be observed that the upper end of the conveyor belt unit C is higher than the lower end thereof. Additionally, the lower end of the conveyor belt 70 is submerged in the water adjacent the fishing boat B.

The conveyor belt unit C is disposed within a tunnel 80 formed in the stern portion of the boat B. The lower end of the tunnel 80 is defined by a generally rectangular opening 82 formed in the transom 34 of the fishing boat B. A horizontal guide roller 84 is provided at the lower portion of the tunnel 80, while a pair of vertical side guide rollers 86 and 88 are arranged at the sides of the tunnel 80.

With continued reference to FIGURE 7 and particular reference to FIGURE 4, a temporary net-support unit, generally designated S, is positioned above the lower portion of the conveyor belt unit C. This temporary net-support unit S includes a horizontal shaft 90 which is rotatably supported between a bracket 92 disposed on one side of the tunnel 80 and a housing 94 arranged at the opposite side of this tunnel.

The longitudinal axis of the shaft 90 is transverse to the fore and aft axis of the boat B. One end of the shaft 90 is keyed to a sprocket wheel 96 that is positioned outwardly of a fixed longitudinally extending wall 97. The sprocket wheel 96 is rigidly secured to an operating handle 98. Mounted adjacent the sprocket wheel 96 is a latch lever 100. This latch lever 100 is pivotally attached at its intermediate portion to a block 102 by means of a horizontal pivot pin 103. The block 102 is secured to the top of the wall 97. One end of the latch lever 100 is adapted to be retained by gravity within any one of the teeth of the sprocket wheel 96. In this manner the sprocket wheel 96 and hence the shaft 90 may be locked against counter-clockwise rotation with respect to the housing 94 relative to FIGURE 4. The latch lever 100 is freed from engagement with the teeth of the sprocket wheel 96 by the exertion of a downward force on the rear end of the latch lever.

The shaft 90 is provided with a plurality of upstanding net-engaging fingers 102. These fingers 102 are longitudinally spaced along the length of the shaft 90. Each finger is of slightly curved configuration, with the curvature being towards the bow of the boat B when the fingers are disposed in their upwardly extending position of FIGURE 4. The fingers 102 are in general alignment with the longitudinal axis of the operating handle 98.

Referring now particularly to FIGURES 5 and 7, there are provided a pair of generally upwardly extending pursing ring-receiving posts 110 and 112. These pursing ring-receiving posts 110 and 112 are preferably removably positioned upon a pair of upwardly and forwardly inclined beams 114 and 116, respectively, arranged along the opposite side of the conveyor belt unit C. As indicated in FIGURES 5 and 7, the posts 110 and 112 are adapted to removably receive the pursing rings 30 for a purpose to be hereinafter explained.

In the operation of the aforedescribed apparatus, the net N will be first set around a school of fish in a conventional manner. Thereafter, the purse line 32 is extended through the tunnel 80 and drawn onto the boat B by means of a conventional power-driven winch 120, as indicated in FIGURE 2. During this step the purse line 32, pursing rings 30 and ring cables 28 will be guided into the tunnel 80 by means of the horizontal roller 84 and the side rollers 86 and 88. After the portion of the net N adjacent the ring cables 28 has been drawn over the shaft 90 of the temporary net-support unit S, the shaft 90 will be rotated counter-clockwise relative to its position of FIGURE 4 until the fingers 102 are in their generally upstanding position of this figure. At this time the fingers 102 will project through the webbing of the net to thereby support this portion of the net on the stern of the boat B. The shaft 90 will be locked in this position by means of the locking lever 100. Thereafter, as indicated in FIGURE 4, the purse line 32 will be removed from the pursing rings 30. Generally, the purse line 32 is formed in separate lengths with adjoining lengths being readily disengageable from one another. Referring now to FIGURE 5, as the purse line 32 is withdrawn from the pursing rings 30, these rings will be dropped over the ring-receiving posts 110 and 112.

Referring now to FIGURE 2, as the purse line 32 is drawn to the boat B, the oposite ends of the net N are extended through the power blocks 44 and 46 and then downwardly to the rear deck 20. During the net handling operation the skiff 130 of the fishing boat B is positioned at the side of the pursed net opposite the boat B. Also, the screw 132 of the boat B will preferably be driving the boat B forwardly relative to the net N. This will maintain the net N rearwardly of and hence clear of the boat B.

The net N is now ready to be emptied of the fish 134 contained therewithin. Referring to FIGURES 3, 6 and 7, this is accomplished by progressively drawing the net N onto the boat by means of the power blocks 44 and 46 while progressively raising the portion of the net opposite the stern of the boat B.

As the power blocks 44 and 46 draw in the sides of the net N the pursing rings 30 slip upwardly off of the ring-receiving posts 110 and 112. When the sides of the net drop onto the fishing boat B the net may be stacked on the rear deck 20 in the manner indicated in FIGURE 3.

The progressive raising of the net is accomplished by means of the skiff 130 and the hoisting lines 52 and 54. Thus, as indicated particularly in FIGURE 6, the operator 136 in the skiff 130 secures one of the hooks 56 to a short line 138 which has been attached to a submerged portion of the net webbing. Thereafter, the hoisting line 52 raises this portion of the net, as indicated in FIGURE 3. As the hook 56 is raising the portion of the net secured thereto, the other lifting hook 58 and hoisting line 54 will be raising another originally submerged portion of the net.

With the hook 58 exerting upward tension on the net N the operator 136 draws the increment 140 of the net secured to the hook 56 into the skiff 130, the hook 56 being lowered to permit such operation. The hook 56 is then secured to another increment of the submerged net portion and thereafter the hook 56 is raised by the hoisting line 52. With the hook 56 again raised, the net increment 142 secured to the hook 58 is lowered into the skiff. These steps are repeated until the net has been gathered and raised to a position immediately adjacent the stern of the boat B, as indicated in FIGURE 7.

During this net raising and gathering procedure fish 142 within the net are progressively and gradually dumped through the transom opening 82 into the lower end of the tunnel 80 and onto the conveyor belt 70. This will continue until substantially all of the fish have been dumped out of the net. The fish deposited upon the lower portion of the conveyor belt 70 are moved forwardly and upwardly through the tunnel 80 until such fish fall off the forward end of the belt into a fish hold 144, as shown in FIGURE 7.

Referring to FIGURE 8, the fish 145 falling off the forward end of the conveyor belt 70 may if desired be deposited into a chute 150 or the like for transfer to a fish hold (not shown) other than hold 144.

It should be noted that the fish being dumped onto the lower portion of the conveyor belt unit C will be bouyed by the water adjacent the transom of the boat B. This facilitates the movement of the fish out of the net N and onto the conveyor belt. Moreover, the fish are emptied from the net in a gradual manner rather than being jammed together. The danger of injuring the fish is thereby minimized.

As indicated by the dotted outline in FIGURE 7, the skiff S may conveniently be stored in the tunnel 80 when not in use. The positioning of the skiff S in the tunnel facilitates the launching and recovery thereof.

While there has been shown herein what is considered to be the preferred embodiment of the present invention, it will be apparent that various modifications and changes may be made with respect to the foregoing description without departing from the spirit of the invention or the scope of the following claims.

I claim:

1. Apparatus for transferring fish onto a fishing boat from a seine net having pursing rings, a purse line and a float line, comprising: power-driven conveyor means; means supporting said conveyor means on the stern of said boat with one of its ends adjacent an opening in said boat and its opposite end adjacent a fish-discharging position; power-operated net retrieving means that progressively raise and gather said net towards said opening whereby fish trapped in said net are progressively dumped out of said net onto said first end of said conveyor means; pursing ring receiving means on the stern of said boat that temporarily receive said pursing rings during the raising and gathering of said net by said net retrieving means; and temporary net-support means on the stern of said boat engageable with said net during said raising and gathering of said net whereby said purse line may be removed from said pursing rings, with the latter thereafter being transferred to said pursing ring receiving means.

2. Apparatus as set forth in claim 1 wherein said temporary net-support means includes a horizontal shaft provided with a plurality of aligned fingers selectively engageable with said net.

3. Apparatus as set forth in claim 2 wherein said pursing ring receiving means includes a plurality of upwardly extending posts.

4. Apparatus for transferring fish onto a fishing boat from a seine net having pursing rings, a purse line and a float line, comprising: upwardly inclined conveyor belt means; means on the stern of said boat supporting said conveyor belt means with its lower end adjacent the water and its upper end adjacent a fish-discharging position leading to said hold; power-operated means on said boat driving said conveyor belt means whereby fish deposited on the lower end of said conveyor belt means are transfered to the upper end thereof; power-operated net retrieving means that progressively raise and gather said net towards said opening whereby fish trapped in said net are progressively dumped out of said net onto said first end of said conveyor belt means; pursing ring receiving means on the stern of said boat that temporarily receive said pursing rings during the raising and gathering of said net by said net retrieving means; and temporary net-support means on the stern of said boat engageable with said net during said raising and gathering of said net whereby said purse line may be removed from said pursing rings, with the latter thereafter being transferred to said pursing ring receiving means.

5. Apparatus as set forth in claim 4 wherein said temporary net-support means includes a horizontal shaft provided with a plurality of aligned fingers selectively engageable with said net.

6. Apparatus as set forth in claim 5 wherein said pursing ring receiving means includes a plurality of upwardly extending posts.

7. Apparatus for transferring fish onto a fishing boat from a seine net having pursing rings, a purse line and a float line, comprising: longitudinally extending tunnel means formed in the stern of said boat leading from an opening in the transom of said boat to a fish-discharging position on said boat; an upwardly inclined power-driven conveyor belt in said tunnel means to transfer fish from said opening to said fish-discharging position; power-operated net retrieving means that progressively raise and gather said net towards said opening whereby fish trapped in said net are progressively dumped out of said net into the lower end of said conveyor belt; pursing ring receiving means on the stern of said boat that temporarily receive said pursing rings during the raising and gathering of said net by said net retrieving means; and temporary net-support means on the stern of said boat engageable with said net during said raising and gathering of said net whereby said purse line may be removed from said pursing rings, with the latter thereafter being transferred to said pursing ring receiving means.

8. Apparatus as set forth in claim 7 wherein said temporary net support means includes a horizontal shaft transverse to said tunnel means at the lower portion of said tunnel means provided with a plurality of aligned fingers selectively engageable with said net.

9. Apparatus as set forth in claim 8 wherein said pursing ring receiving means includes a post disposed at each side of said tunnel means.

10. Apparatus for transferring fish from a net to the hold of a fishing boat, comprising: upwardly inclined power-driven conveyor means; means on the stern of said boat supporting said conveyor means with the lower end of said conveyor means adjacent the water and the upper end of said conveyor means disposed in a fish discharging position leading to said hold; net holding means on the stern of said boat, adapted to hold one portion of said net, disposed adjacent the lower end of said conveyor means; and power operated net retrieving means adapted to progressively raise and gather the remaining portion of said net toward said net holding means, whereby fish trapped by said net may be dumped out of said net onto said lower end of said conveyor means.

11. Apparatus for transferring fish from a net to the hold of a fishing boat, comprising: tunnel means formed on said boat leading from an opening in the stern of said boat to a fish-discharging position leading to said hold; a power-driven conveyor belt in said tunnel means having its first end adjacent said opening and its second end adjacent said fish-discharging position; means disposed adjacent said first end of said conveyor belt adapted to hold a portion of said net; and power-operated net retrieving means on said boat that progressively raise and gather the remaining portion of said net toward said net holding means, whereby fish trapped in said net may be dumped out of said net onto the first end of said conveyor belt.

12. Apparatus for transferring fish from a net to the hold of a fishing boat, comprising: upwardly inclined power-driven conveyor means formed on said boat, said boat supporting said conveyor means with the lower end of said conveyor means adjacent the water and the upper end of said conveyor means adjacent a fish-discharging position leading to said hold; net holding means disposed adjacent the lower end of said conveyor means adapted to hold a portion of said net; and power-operated net retrieving means adapted to progressively raise and gather the remaining portion of said net toward said net holding means whereby fish trapped in said net may be dumped out of said net onto the first end of said conveyor belt.

References Cited in the file of this patent
UNITED STATES PATENTS

| | | |
|---|---|---|
| 2,347,412 | Higgins | Apr. 25, 1944 |
| 2,579,787 | Burney | Dec. 25, 1951 |
| 2,898,695 | Behring | Aug. 11, 1959 |
| 2,997,188 | Hauser | Aug. 22, 1961 |

OTHER REFERENCES

"The Case of the Stern Ramp," published October 1961 in "World Fishing," pages 28, 29 and 35.